UNITED STATES PATENT OFFICE 2,413,648

TERPENE REACTION PRODUCT AND METHOD OF PRODUCING

Emil Ott, Wilmington, Del., assignor to Hercules Powder Company, Wilmington, Del., a corporation of Delaware No Drawing. Application June 28, 1945, Serial No. 602,173

16 Claims. (Cl. 260—125)

This invention relates to a new composition of matter and to a method for its production, and, more particularly, it relates to terpene compounds containing sulfur and phosphorus and to a method for their production.

In accordance with this invention, it has been found that sulfhydrated terpenes may be converted into valuable compositions containing phosphorus and sulfur by heating sulfhydrated terpenes with sulfides of phosphorus at a temperature within the range of about 90° C. to about 300° C.

In producing these compositions, a terpene, turpentine, for example, which has been sulfhydrated by contact with hydrogen sulfide in the presence of a phosphoric acid catalyst until it contains about 5% to about 25% sulfur, may be reacted with phosphorus pentasulfide at about 90° C. to about 300° C. until evolution of hydrogen sulfide ceases. The hot fluid may be decanted from impurities and allowed to cool.

More detailed embodiments of the present invention are set forth in the following examples:

EXAMPLE I

A mixture of 20 parts of sulfhydrated alpha-pinene containing 12.1% sulfur and 20 parts of $P_2S_5$ was heated for three hours at about 150° C. to about 200° C. During this heating period, hydrogen sulfide was evolved. The liquid product was then decanted from a small amount of solid impurities introduced with the $P_2S_5$. After cooling, the product was a viscous gumlike material amounting to about 35 parts and containing by analysis 32.7% sulfur and 16.7% phosphorus.

EXAMPLE II

A mixture of 55 parts sulfhydrated dipentene containing 11.4% sulfur and 55 parts of $P_2S_5$ was heated together as in Example I. The product amounting to 80 parts was a brown gumlike material containing 31.4% sulfur and 16.7% phosphorus.

EXAMPLE III

A mixture of 50 parts of sulfhydrated allo-ocimene containing 13.2% sulfur and 50 parts $P_2S_5$ was heated at 150° C. to 180° C. for three hours. The dark brown resinous product contained by analysis 30.4% sulfur and 17.8% phosphorus.

EXAMPLE IV

A mixture of 20 parts sulfhydrated pinene containing 19.7% sulfur and 10 parts $P_2S_5$ was heated together at 150° C. to 180° C. for three hours. The product was decanted from insoluble material and cooled. The resulting composition was a brown viscous material containing 35.5% sulfur.

EXAMPLE V

A mixture of 20 parts sulfhydrated pinene containing 19.7% sulfur and 20 parts $P_2S_5$ was heated together under reflux at about 150° C. to 180° C. until refluxing ceased and no more hydrogen sulfide was evolved. This required about 2½ hours. The solid resinous product contained 39.3% sulfur.

EXAMPLE VI

A mixture of 20 parts sulfhydrated camphene consisting of about 85% mercapto camphane and 20 parts mineral oil was heated with 20 parts of $P_2S_5$ at about 150° C. to about 180° C. for three hours. During the first hour of heating, hydrogen sulfide was evolved. The resulting product was decanted from the small amount of unreacted $P_2S_5$. After cooling, the mineral oil concentrate of the phosphorus and sulfur containing terpene compound was a light-brown semi-solid. It contained about 24.3% sulfur and about 8.3% phosphorus and was soluble at about 5% to about 10% in lubricating oil.

The sulfhydrated terpenes with which this invention is concerned may be prepared according to U. S. 2,076,875 to Borglin and Ott from pinenes, dipentene, terpinenes, terpinolene, terpineol, camphene, fenchenes, bornylene, carvomenthene, para-menth-8(9)-ene, etc., and hydrogen sulfide using a catalyst, preferably an acidic catalyst such as phosphoric acid, for example. The sulfhydration may be carried out until the sulfur content is within the range 5–25% sulfur. Sulfhydrated alpha-pinene having 5% sulfur will be rich in unreacted pinene but will also contain small amounts of monocyclic terpenes. If desired, the low-boiling sulfur-free terpenes may be removed by distillation. The 5% sulfur will be combined as in thioterpineol, mono- and di-thioterpinol and as thioethers. If desired, the mercaptans may be separated from the ethers by extraction with alkali, and the fractions so produced may be used separately in reaction with $P_2S_5$ in accordance with this invention. Sulfhydrated alpha-pinene containing higher amounts of sulfur will be rich in thioterpinol and will contain only small amounts of unreacted terpenes and thioterpineol. Sulfhydrated camphene is chiefly mercaptocamphane with only small amounts of thioethers. The term "sulfhydrated terpene" is intended to include terpene mercaptans, such as thioanalogs of borneol, isoborneol, alpha-, beta-, and gamma-terpineols, 1,4-terpinol, and 1,8-terpinol in the pure state or in mixtures and corresponding thioethers whether produced by the process disclosed by Borglin and Ott or by any other process.

Since the unsaturated terpenes which remain in the partially sulfhydrated terpene mixture are reactive with $P_2S_5$, the crude sulfhydrated terpene mixture containing relatively small or relatively large amounts of terpenes may be used. For example, a sulfhydrated turpentine or pinene containing 5% sulfur corresponding to 25% thioterpineol and about 75% unreacted turpentine may be reacted with $P_2S_5$ in accordance with this invention to produce an oil-soluble product of value as a lubricating oil addition agent.

The sulfides of phosphorus may be any of the known compounds such as $P_2S_3$, $P_2S_5$, $P_4S_7$, $P_4S_3$, etc., or mixtures. Preferably, commercial $P_2S_5$, which is a mixture predominating in $P_2S_5$, will be used.

The reaction may be carried out in the presence or absence of a solvent. The solvent may be a low-boiling solvent, such as a gasoline, paramenthane, toluene, cymene, etc., and the reaction may be carried out at reflux. Where a solvent of boiling point below the desired reaction temperature is employed, the amount of solvent may be such as to permit the nonvolatile reactants reaching the reaction temperature or superatmospheric pressure may be employed. Higher-boiling solvents, such as mineral oil, for example, lubricating oil, may also be used. The reaction is desirably carried out in a 50% lubricating oil solution when the product is to be used as an addition agent for lubricating oils.

The temperature of reaction may be within the range of about 90° C. to about 300° C., but the range of about 150° C. to about 200° C. is preferred.

The time of reaction will be variable and will depend on the reaction temperature and other factors. It should be sufficiently long to allow essentially complete evolution of hydrogen sulfide. This time may thus vary from about ten hours at a reaction temperature of about 100° C. to as little as 30 minutes at 300° C. Thus, for example, at 150° C. the reaction time will be two to three hours.

The products of this invention will vary from viscous liquids to resinous solids, depending upon the amount of sulfur and the type of sulfur linkage in the sulfhydrated terpene and depending also on the amount of sulfide of phosphorus and the extent of reaction as effected by time and temperature of heating. Ordinarily, the products are soluble in hydrocarbons and other organic solvents up to about 10% concentration.

The phosphorus and sulfur-containing compositions of this invention are useful in flotation as shown by the data in the following table:

TABLE

*Collecting action of sulfurized pinene-phosphorus pentasulfide reaction product*

| | Parts | Copper, per cent | Copper recovery, parts |
|---|---|---|---|
| Concentrate | 9.6 | 23.6 | 2.26 |
| Tailings | 90.4 | 2.05 | 1.85 |
| Original ore | 100.0 | 4.11 | |

The above data were obtained on 100 parts Matahambre copper ore ground to pass a 40 mesh screen when added to a flotation apparatus containing 300 parts water, 2 parts 1% lime slurry, 4 parts 0.1% sodium cyanide solution, 0.1 part pine oil and 0.01 part of the sulfurized pinene-phosphorus pentasulfide reaction product. The flotation time was 10 minutes. Without the collector present a concentrate containing only about 10% copper was obtained.

The phosphorus and sulfur-containing compositions are also useful as addition agents for reducing corrosion of lubricating oils and greases toward the newer copper-lead and nickel-cadmium bearings.

What I claim and desire to protect by Letters Patent is:

1. The method of producing a reaction product of a sulfhydrated terpene and a sulfide of phosphorus which comprises heating a sulfhydrated terpene with a sulfide of phosphorus at a temperature within the range of about 90° C. to about 300° C.

2. The method of producing a reaction product of a sulfhydrated terpene and a sulfide of phosphorus which comprises heating a sulfhydrated terpene with phosphorus pentasulfide at a temperature within the range of about 90° C. to about 300° C.

3. The method of producing a reaction product of a terpene mercaptan and a sulfide of phosphorus which comprises heating a material containing a terpene mercaptan with a sulfide of phosphorus at a temperature within the range of about 90° C. to about 300° C.

4. The method of producing a reaction product of a terpene mercaptan and a sulfide of phosphorus which comprises heating a material containing a terpene mercaptan with phosphorus pentasulfide at a temperature within the range of about 90° C. to about 300° C.

5. The method of producing a reaction product of a sulfhydrated pinene and a sulfide of phosphorus which comprises heating a sulfhydrated pinene with phosphorus pentasulfide at a temperature within the range of about 90° C. to about 300° C.

6. The method of producing a reaction product of a sulfhydrated dipentene and a sulfide of phosphorus which comprises heating sulfhydrated dipentene with phosphorus pentasulfide at a temperature within the range of about 90° C. to about 300° C.

7. The method of producing a reaction product of a sulfhydrated camphene and a sulfide of phosphorus which comprises heating sulfhydrated camphene with phosphorus pentasulfide at a temperature within the range of about 90° C. to about 300° C.

8. A new composition of matter comprising the product of reaction of a sulfhydrated terpene with a sulfide of phosphorus.

9. A new composition of matter comprising the product of reaction of a terpene mercaptan with a sulfide of phosphorus.

10. A new composition of matter comprising the product of reaction of a terpene mercaptan with phosphorus pentasulfide.

11. A new composition of matter comprising the product of reaction of a sulfhydrated pinene with a sulfide of phosphorus.

12. A new composition of matter comprising the product of reaction of a sulfhydrated pinene with phosphorus pentasulfide.

13. A new composition of matter comprising the product of reaction of sulfhydrated dipentene with a sulfide of phosphorus.

14. A new composition of matter comprising the product of reaction of sulfhydrated dipentene with phosphorus pentasulfide.

15. A new composition of matter comprising the product of reaction of sulfhydrated camphene with a sulfide of phosphorus.

16. A new composition of matter comprising the product of reaction of sulfhydrated camphene with phosphorus pentasulfide.

EMIL OTT.